United States Patent [19]
O'Rarden

[11] Patent Number: 4,913,614
[45] Date of Patent: Apr. 3, 1990

[54] PIANO MOVING APPARATUS

[76] Inventor: Patrick L. O'Rarden, 1477 Rockshine, Plano, Tex. 75074

[21] Appl. No.: 320,881

[22] Filed: Mar. 9, 1989

Related U.S. Application Data

[63] Continuation of Ser. No. 932,881, Nov. 20, 1986, abandoned.

[51] Int. Cl.$^4$ ................................................ B60P 1/34
[52] U.S. Cl. .................................... 414/343; 414/346; 414/458; 414/678; 414/754; 414/500; 414/538; 269/17; 187/9 R
[58] Field of Search .................. 269/17; 414/343, 345, 414/678, 458, 459, 460, 461, 349, 350, 346, 347, 340, 783, 754, 779, 639, 640, 652, 653, 500, 538; 187/9 R; 254/3 A, 3 B, 3 C

[56] References Cited

U.S. PATENT DOCUMENTS

| | | | |
|---|---|---|---|
| 722,296 | 3/1903 | Gassard | 414/754 |
| 2,997,292 | 8/1961 | Lucker et al. | 269/17 |
| 3,414,087 | 12/1968 | Schmiesing | 414/458 X |
| 3,643,935 | 2/1972 | Bell | 269/17 X |
| 3,672,634 | 6/1972 | Chaffin | 414/458 X |
| 4,122,958 | 10/1978 | Thayer | 414/343 X |
| 4,599,034 | 7/1986 | Kennedy et al. | 414/678 |

FOREIGN PATENT DOCUMENTS

783163 11/1980 U.S.S.R. .............................. 414/678

Primary Examiner—Frank E. Werner
Attorney, Agent, or Firm—Hubbard, Thurman, Turner, Tucker & Harris

[57] ABSTRACT

A unique piano moving apparatus is provided which may be operated to safely and efficiently move a grand piano by one or two individuals of average physical ability. A keyboard and jack assembly having a first support portion is mutually spaced from and intersecured to an opposing end jack assembly having a second support portion. The support portions are respectively adapted to underlie and support the key board and front end portions of a grand piano. The keyboard and jack and oppasing end jack assemblies are operable to lift the piano to a position in which it may be tilted on its side while still being supported by the piano moving apparatus. The tilted piano may then be slid off the moving apparatus onto a movable platform which may then be conveniently rolled to and loaded onto a waiting transport trailer. A winch device may be used to pull the movable platform and piano into the transport trailer.

4 Claims, 5 Drawing Sheets

PIANO MOVING APPARATUS

This application is a continuation of Ser. No. 932,881 filed Nov. 20, 1986, now abandoned.

BACKGROUND OF THE INVENTION

The present invention relates generally to equipment moving apparatus, and more particularly provides unique piano moving apparatus which facilitates and greatly simplifies the task of moving pianos— particularly large grand pianos.

The art of moving pianos has remained substantially unchanged over the centuries. Even the most efficient modern piano moving techniques have incorporated very little mechanical assistance. Grand pianos are notoriously cumbersome, heavy instruments which are nevertheless very delicate and require extreme care in handling, and therefore have not been well suited to mechanized transport. Modern piano movers, therefore, typically rely solely on manpower to carefully lift the grand piano, tilt it on its side and carry it through the doorway of the average conservatory or dwelling.

In performing this very difficult manual task, the piano legs are first removed and replaced with temporary supports. The flat body of the piano is then carefully tilted on its side and placed on a padded support board. It is at this point that the piano is most vulnerable to damage, since the piano may easily be dropped as it is positioned on its side. The temporary leg supports may accidently become detached, or the individuals moving the piano may not have sufficient strength to gently lower the piano onto its side. Often, as the piano is being rotated onto its side the momentum generated is sufficient to cause the piano to abruptly turn upside-down and cause permanent damage. Once secured on its side to the support board, the piano may be mounted on a dolly or other roller means to facilitate movement of the piano along a flat surface.

The art of moving pianos is therefore a very labor intensive task, requiring usually brawny individuals to carefully manipulate the instrument to avoid damage. The labor intensive procedure required to safely move a piano is particularly onerous in situations where the piano must be moved on a regular basis such as between concert locations.

Commercially available mechanical lifting equipment, thought often designed to lift less delicate articles, has to some degree facilitated the movement of pianos. For example, many trucks are equipped with a hydraulic platform to raise heavy objects level with the bed of the truck. However, trucks equipped in this manner are relatively expensive and do not solve the problem of placing the piano on the support board on its side for transport through doorways. Cranes and other large machinery are also sometimes used to lift a piano between ground level and an upper story of a building. While this type of equipment is certainly helpful, and often necessary, it is quite costly and likewise does not solve the problems associated with tilting the piano onto a support board for subsequent transport thereof.

From the foregoing it can be seen that a need exists for improved mechanical apparatus for safely and efficiently moving a piano from one location to another. It is accordingly an object of the present invention to provide such improved apparatus.

SUMMARY OF THE INVENTION

In carrying out the principles of the present invention, in accordance with a preferred embodiment thereof, an improved piano moving apparatus is provided for elevating, rotating, and transporting a grand piano. First and second jack assemblies are intersecured and mutually spaced about the piano and are positioned to engage the underside of the piano. The first jack assembly includes a jack means having a support portion specifically adapted to underlie and support the key end of piano. The support portion is pivotally secured by mount means to elevational support means of the first jack assembly. The mount means permits rotation of the support portion and its piano load about the longitudinal axis of the piano. The mount means securing the support portion to the jack assembly includes a self centering thrust bearing for rotation. The elevational support means includes a hydraulic cylinder actuator disposed within a support post which may be manually actuated by a handle mechanism to raise and lower the piano.

The second jack assembly of the present invention is constructed in a manner generally similar to the first jack assembly and is intersecured thereto about the piano. The support portion of the front jack assembly is positioned to underlie the rear end (end opposite the keyboard end) of the piano and includes mounting pads selectively positioned thereon to suitably engage the underside of the front end of the piano. Mount means secure the support portion to elevational support means of the front jack assembly, which likewise include a hydraulic actuator to selectively raise and lower the support portion and its load. The mount means includes a self centering thrust bearing about which the support portion may be rotated. As the piano is elevated by the front jack and key jack assemblies and rotated about its longitudinal axis, side support means carried by each of the support portions engage and support the side surface of the piano during and after pivoting of the piano to thereby permit the piano to be removed from the apparatus in its tilted position.

In accordance with another aspect of the present invention, the mount means of each jack assembly include stop means to restrict full 180° rotation of the support portions and piano mounted thereon. Stop pins inserted through each support portion into its respective mount means arrest the apparatus from rotational motion during elevation of the piano. Upon removal of the stop pins, stop means comprising rigid members secured to the mount means impinge upon a side member of the support portion to limit rotation of the support portion to a maximum of 85° from the original position parallel to the floor. The limited rotation of the device due to this stop means feature serves to enhance control of the piano during rotation and prevent the piano from being completely overturned.

During use of the present invention, each of the jack assemblies are positioned about their respective ends of the piano and a cross bracket assembly is mounted therebetween to intersecure the key jack to the front jack assemblies. The piano is then elevated and the stop pins are removed to permit rotation of the piano onto a generally downwardly facing side. A piano support board is placed against the side of the piano to cushion the downwardly facing side during rotation and remains in position to be received by a waiting movable dolly platform. The piano secured to the support board is positioned on the moving dolly and rolled to a waiting transport trailer. The transport trailer includes a mechanical winch means, which may be used to pull the dolly and piano between guide rails onto the trailer bed.

The unique piano moving apparatus of the present invention, as can be seen, transforms what used to be a Herculean task into one which may be performed by one or two individuals of average physical ability. The task of moving pianos has heretofore not been well suited to any form of mechanized transport primarily due to the delicate nature of this musical instrument. The present invention provides a rugged, maintenance free apparatus easily operable to elevate, rotate and transport a standard grand piano without the previously required team of husky movers. The piano is moved safely, quickly and without damage thereto by the easy operation heretofore described.

DETAILED DESCRIPTION

Figure 1:
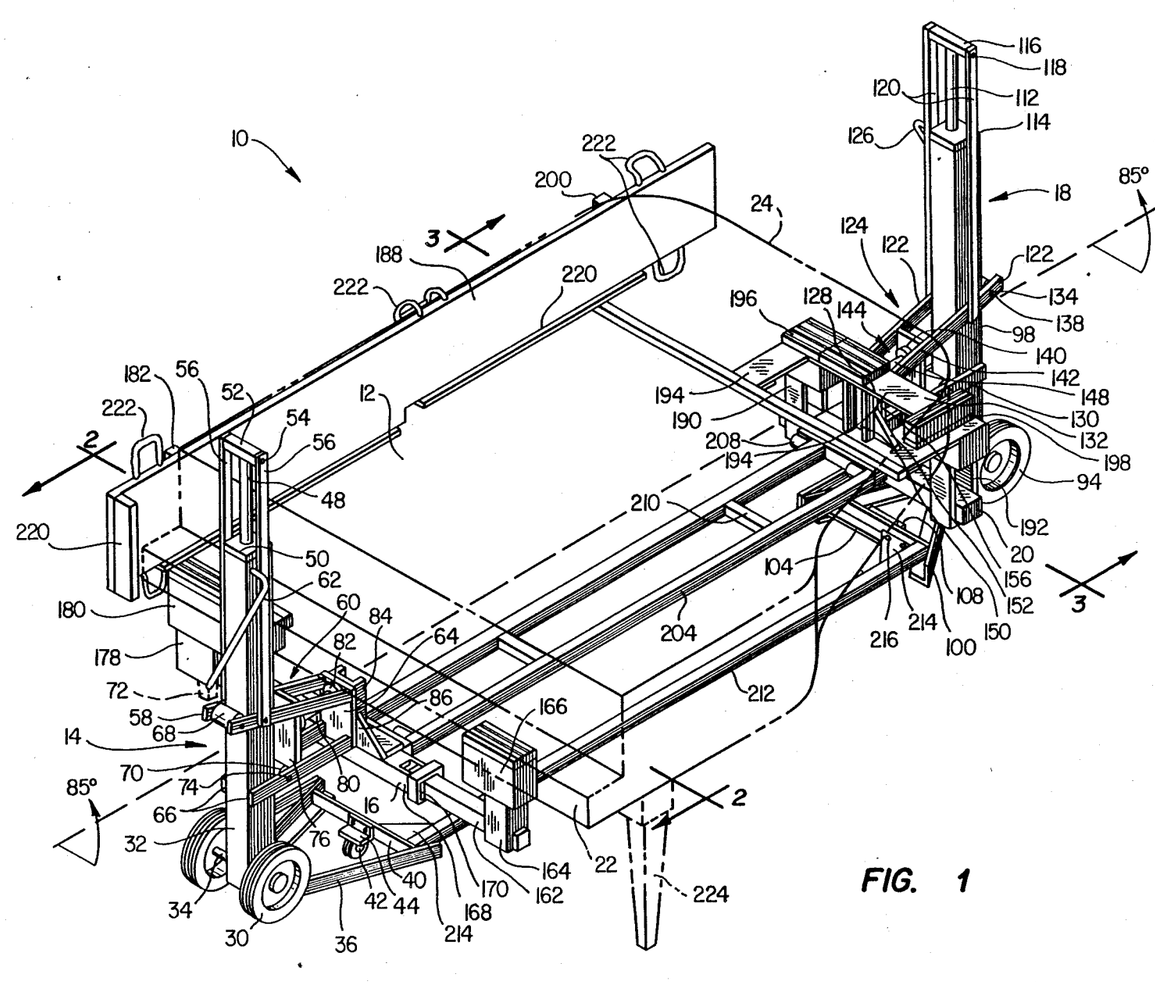
FIG. 1 is a perspective view of the piano moving apparatus which embodies principles of the present invention and is utilized to safely and efficiently lift a grand piano (illustrated in phantom), tilt the lifted piano onto its side, and deposit the titled piano onto a suitable moving dolly.

Perspectively illustrated in FIG. 1 is a unique piano moving apparatus 10 which embodies principles of the present invention and is used to safely and efficiently move a grand piano 12. Apparatus 10 comprises a keyboard jack assembly 14 having a support portion 16 pivotally connected thereto, and a back (end opposite the keyboard end) jack assembly 18 having a support portion 20 pivotally connected thereto, the two jack assemblies being spaced apart and intersecured in a manner subsequently described. Support portion 16 and 20 are respectively adapted to underly and support the keyboard end and opposite end portions 22 and 24 of the piano 12. As will be seen, the jack assemblies 14 and 18 are operable to lift the piano 12 (FIG. 4) to a position in which it may be tilted on its side (FIG. 5) while still being supported by the apparatus 10. The tilted piano 12 may then be slid off moving apparatus 10 onto a moving dolly 26 (FIG. 6) which is then conveniently rolled to and loaded onto a waiting transport trailer 28 (see FIG. 7).

Apparatus 10 respresents a significant departure for the manner in which pianos have heretofore been transported. Generally, grand pianos are cumbersome instruments weighing approximately 1500 pounds, yet are constructed with fine and delicate cabinet work and may cost as much as $50,000. A team of movers normally required to transport the piano are often unable to collectively manage to handle the piano without some resultant damage. Apparatus 10, however, may be operated by one or two individuals of average physical strength to safely elevate, rotate, and roll the piano into a trailer for transport. Movement of the piano 12 is further facilitated by the unique design of apparatus 10 having relatively maintenance free components which are described in detail as follows.

Figure 2:
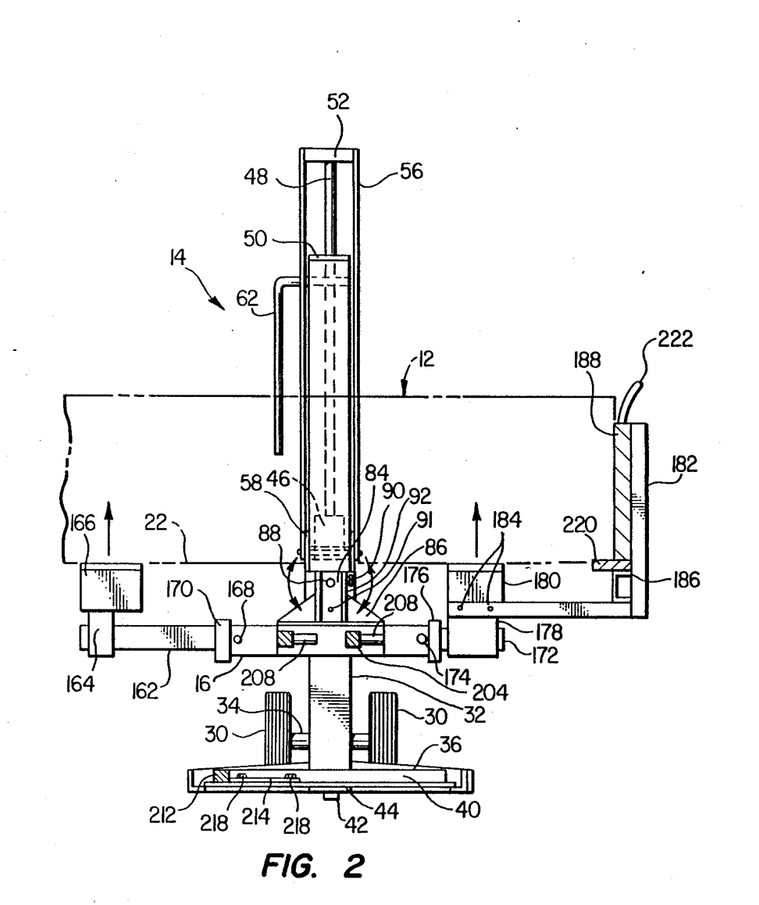
FIG. 2 is an enlarged scale cross-sectional view though the apparatus, taken along line 2—2 of FIG. 1, and illustrates, in elevation, a key jack assembly portion thereof.

Keyboard jack assembly 14 is easily moved into position about key board portion 22 of piano 12 by wheels 30. Wheels 30 are connected at the base of support post 32 of jack assembly 14 by a standard axle member 34. Support post 32 bears the load of the piano and is further stabilized by foot rails 36 welded thereto by gussets 38. Foot rails 36 are arranged in a manner suitable for maximum stability of the apparatus 10 under an elevated load, for maximum safety. Foot rails 36 are constructed to further include cross rail 40 having retractable wheel 42. Retractable wheel 42 is positioned by tension bracket 44 to engage with the floor, but retract upon receiving the load of piano 12. Disposed within support post 32 is hydraulic cylinder actuator 46 (FIG. 2). Actuator 46 may be any standard, commercially available hydraulics with sufficient load bearing characteristics. Numerous mechanical linkage systems may be contemplated to engage hydraulic cylinder actuator 46, but in the preferred embodiment piston rod 48 extends through cap 50 to engage cross brace 52. Cross brace 52 is secured by pin 54 or other suitable means to lifters 56. Lifters 56 extend along either side of support posts 32 and are connected respectively to upper jack stand brackets 58 of jack stand mount 60. Consequently, piston rod 48 impinging upon cross brace 52 permits vertical motion of jack stand mount 60 along support posts 32. Vertical motion of jack stand mount 60 and hence piano 12 may be manually controlled by handle 62 as desired. Jack stand mount 60 includes front bearing plate 64 which is welded or otherwise suitable secured to upper jack stand brackets 58. Extending from a lower portion of front bearing plate 64 are lower jack stand brackets 66 which extend about either side of support posts 32. Rollers 68 and 70 respectively are mounted on bearing pins 72 and 74 between each of upper jack stand brackets 58 and lower jack stand bracket 66, respectively, and serve to rollably secure for vertical motion jack stand mount 60 along support post 32 in response to actuation of the hydraulic cylinder actuator 46. Support gusset plate 76 is welded to upper jack stand brackets 58 and lower jack stand brackets 66 to provided added support to jack stand mount 60 and further furnishes support for the rear bearing mount 78 of self centering thrust bearing 80. Self centering thrust bearing 80 (FIGS. 1 and 4) has a front bearing mount 82 which extends through front bearing plate 64 and functions to permit support portion 16 to rotate relative to key jack assembly 14. Support mount 84 is secured by gussets 86 to support portion 16 and is rotatably secured to jack stand mount 60 at front bearing plate 64 by centering shaft 88. Thereby, support mount 84 and subsequently support portion 16 with its load of piano 12 are free to rotate about the longitudinal axis of centering shaft 88 connected by self centering thrust bearing 80 to jack stand mount 60. Self centering trust bearing 80 is of a conventional three set screw mount and generally has a load capacity of 5,000 pounds.

Figure 5:
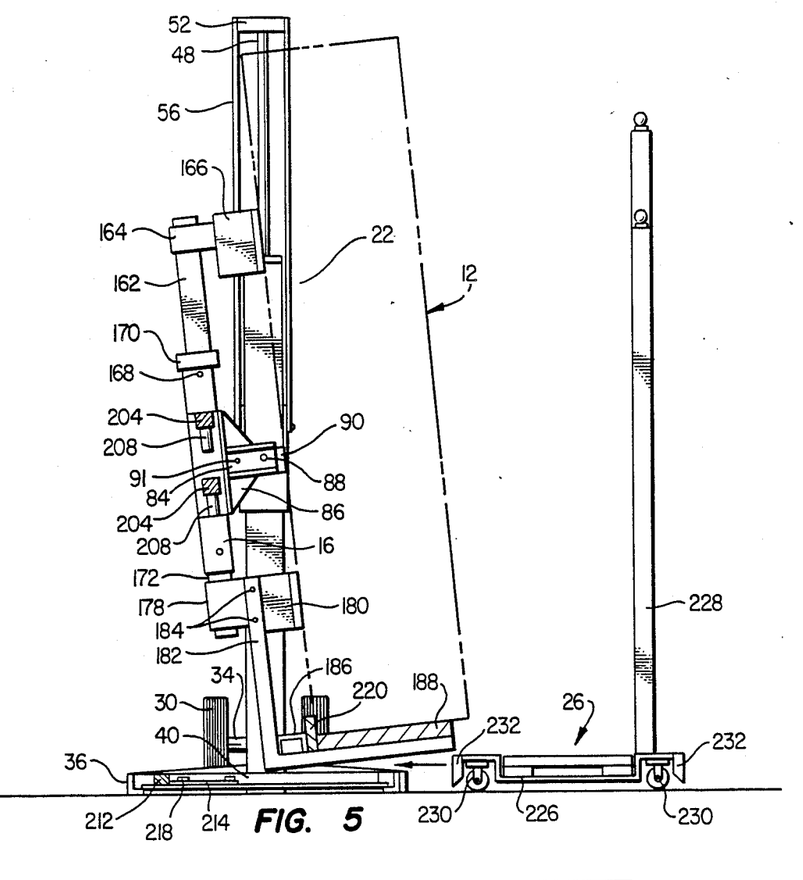
FIG. 5 is a cross-sectional view similar to that in FIG. 2, but with the piano in its lifted and titled position and ready to be shifted onto a moving dolly.
Figure 6:
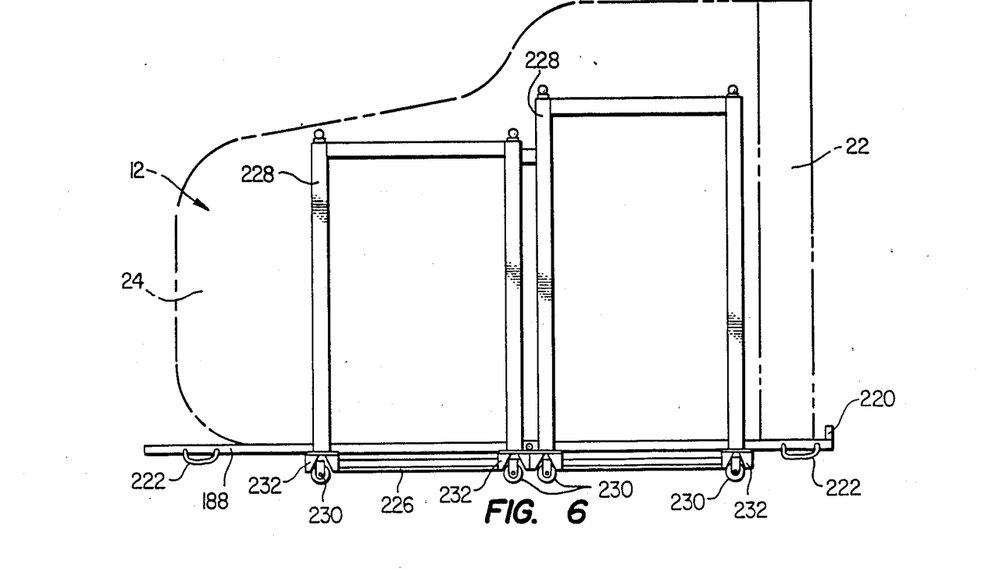
FIG. 6 is a reduced scale side elevational view of the moving dolly having the piano resting on its side thereon.

As will be subsequently described, front bearing plate 64 also includes stop means 90 prevent full 360° rotation of support mount 84 and hence piano 12, about the longitudinal axis of centering shaft 88 (FIGS. 2 and 5). Stop means 90 is located on the surface of front bearing plate 64 and communicates with support mount 84. Stop means 90 consists of a rigid metal material welded in position on front bearing plate 64 to engage a side wall 92 of support mount 84 thereby restricting its motion. Stop means 90 allows rotation of support portion 16 only in one direction, restricted to 8520 . As the rotation angle of support portion 16 approaches 85°, side wall 92 of support mount 84 engages stop means 90 and further rotation is prevented. (FIG. 5). This safety feature results in a controlled rotation of piano 12 and facilitates placement of piano 12 onto moving dolly 26 without overturning. Additionally, lock pin 93 is provided to arrest rotational motion of support portion 16 completely. Lock pin 93 inserts into bore hole 95 which extends through support mount 84 and front bearing plate 64, locking piano 12 perpendicular to the floor.

Figure 3:
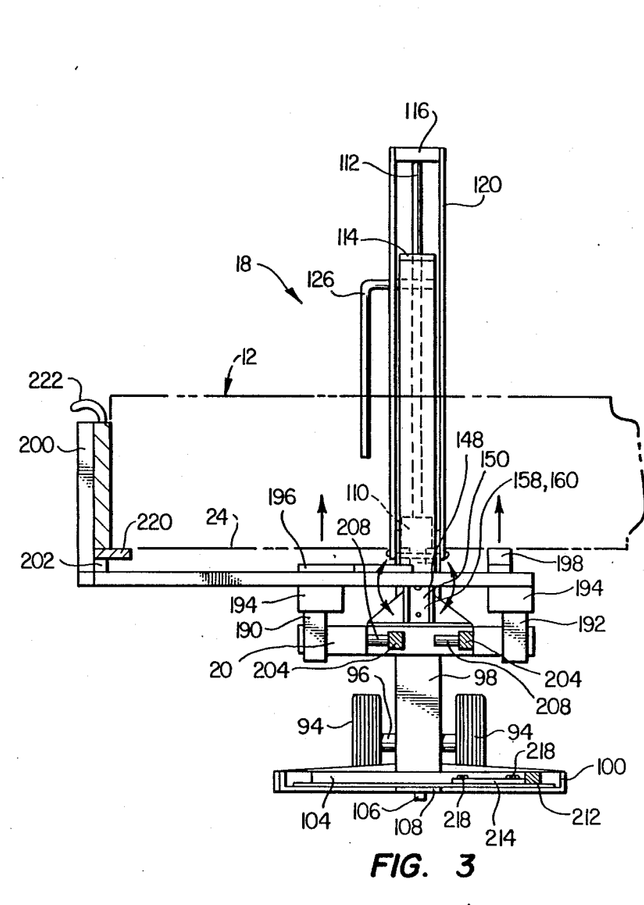
FIG. 3 is an enlarged scale cross-sectional view through the apparatus, taken along line 3—3 of FIG. 1, and illustrates, in elevation, a front jack assembly portion thereof.

The back jack assembly 18 is constructed in a manner generally similar to that of keyboard jack assembly 14 (FIGS. 1 and 3). Wheels 94 are connected by axle 96 to the base of support post 98. Support post 98 carries the load of the front end 24 of piano 12 and is stabilized by foot rails 100. Foot rails 100 are welded to the base of support post 98 by gussets 102 and extend in a suitable manner regularly therefrom to prevent overturning of apparatus 10. Cross rail 104 serves to further secure foot rails 100 and includes a retractable wheel 106. Retractable wheel 106 is mounted to cross rail 104 by tension bracket 108 which resides to permit communication of cross rail 108 with the floor upon receiving a load of piano 12, yet otherwise engages the floor as previously described retractable wheel 42. Disposed within support post 98 in hydraulic cylinder actuator 110 (FIG. 3). Piston rod 112 extends through cap 114 to engage cross brace 116. Cross brace 116 is secured by pin 118 or other suitable means to lifters 120. Lifters 120 extend along each side of support post 98 and are secured by suitable means to upper jack stand brackets 122 of jack stand mount 124. Jack stand mount 124 moves vertically along support post 98 in response to actuation of hydraulic cylinder 110 by manual operation of handle 126. Jack stand mount 124 includes upper jack stand brackets 122 welded to front bearing plate 128. Welded to the lower portion of front bearing plate 128 are lower jack stand brackets 130 which extend respectively about either side of support post 98. Rollers 132 and 134 are secured respectively between upper jack stand brackets 122 and lower jack stand brackets 130 bybearing pins 136 and 138. The surfaces of rollers 132 and 134 engage support post 98 supporting the weight of jack stand mount 124 and hence piano 12, and allow for translational motion of jack stand mount 124 vertically along support post 98. Rear bearing plate 140 is suitably welded to upper jack stand brackets 122 and lower jack stand brackets 130 for additional support thereof. Rear bearing plate 140 also houses rear bearing mount 142 of self centering thrust bearing 144. Self centering thrust bearing 144 carries a load of approximately 5,000 pounds and permits free rotation of piano 12 along its longitudinal axis of as shown in FIGS. 1 and 5, and as previously described with reference to self centering thrust bearing 80. Front bearing mount 146 is secured to front bearing plate 128 by set screws of other suitable means. Centering shaft 148 extends through front bearing plate 128 into support mount 150. Support mount 150 is welded or otherwise secured by gussets 152 to support portion 20. Support mount 150 is free to rotate about the axis of centering shaft 148 relative to front bearing mount 146 for rotation of piano 12.

As discussed with reference to key jack assembly 14, stop means 154 are secured to the surface of front bearing plate 128 for contact with support mount 150. Stop means 154 impinge upon side wall 156 of support mount 150 to prevent clockwise rotation of support portion 20 and further limit rotation to 85°. Upon approaching 85° of rotation, stop means 154 impinge a portion of side wall 156 to prevent further rotation. An additional safety feature of apparatus 10 is lock pin 158. Bore hole 160 extends through support mount 150 and front bearing plate 128, such that when lock pin 158 is in place support portion 120 may not be rotated and remains perpendicular to the floor.

Support portion 16, as seen in FIG. 2, is particularly adapted for support of the key board end 22 of piano 12. Support portion 16 includes rotating extension bracket 162 which has secured at is distal end mount support 164. Mount support 164 is selectively positionable along rotating extension bracket 162, according to the particular underside dimensions of piano 12. Mount support 164 includes mounting pad 166 for engaging the underside of key board end 22. Rotting extension bracket 166 may be pivotable about pin 168 to an upright position for transport of key jack assembly 14 through restricted areas and is retained in its operational position by locking sleeve 170. Rotating extension bracket 172 of support portion 16 is generally shorter in length than rotating extension bracket 162, and is also rotatable about pin 174 and retained in the operational mode by locking sleeve 176. Mount support 178 selectively positioned along rotating extension bracket 172 includes mounting pad 180 to engage the underside of key board end 22. both mounting pads 166 and 180 are constructed of suitably pliable rubber or plastic to prevent damage to the finish of piano 12. Piano support arm 182 is secured by bolts 184 or other suitable means to mount support 178, and functions to retain the side of piano 12 during rotation and loading or unloading (FIG. 5). Piano support arm 182 likewise incorporates spacer 186 for elevating piano board 188 to the desired level, as will be subsequently described.

Just as support portion 16 is uniquely constructed to safely support key board end 22 of piano 12, support portion 20 is likewise particularly adapted to engage front end 24 of piano 12. Support portion 20 is generally shorter in length than support portion 16, corresponding to the characteristic dimensions of the stand grand piano. Mount supports 190 and 192 are selectively positionable respectively at each distal end of support portion 20, so as to correspond to the particular piano requirements and adequately engage the underside of front end 24. Mounting shelf 194 is secured by suitable means to mount supports 190 and 192 for retaining mounting pads 196 and 198. Mounting pads 196 and 198 are specifically designed and positioned to engage the underside of front end 24 of piano 12. As described with reference to mounting pads 166 and 180, mounting pads 196 and 198 are constructed of rubber or plastic material to adequately cushion piano 12, are positioned to maximize support and stability during elevation and rotation. Piano support arm 200 is secured by suitable means to mounting shelf 194 and extends, as seen in FIG. 3, to engage the side of piano 12 during rotation. Piano support arm 200 likewise includes a spacer 202 to permit elevation of piano board 188 to the desired level.

Figure 4:
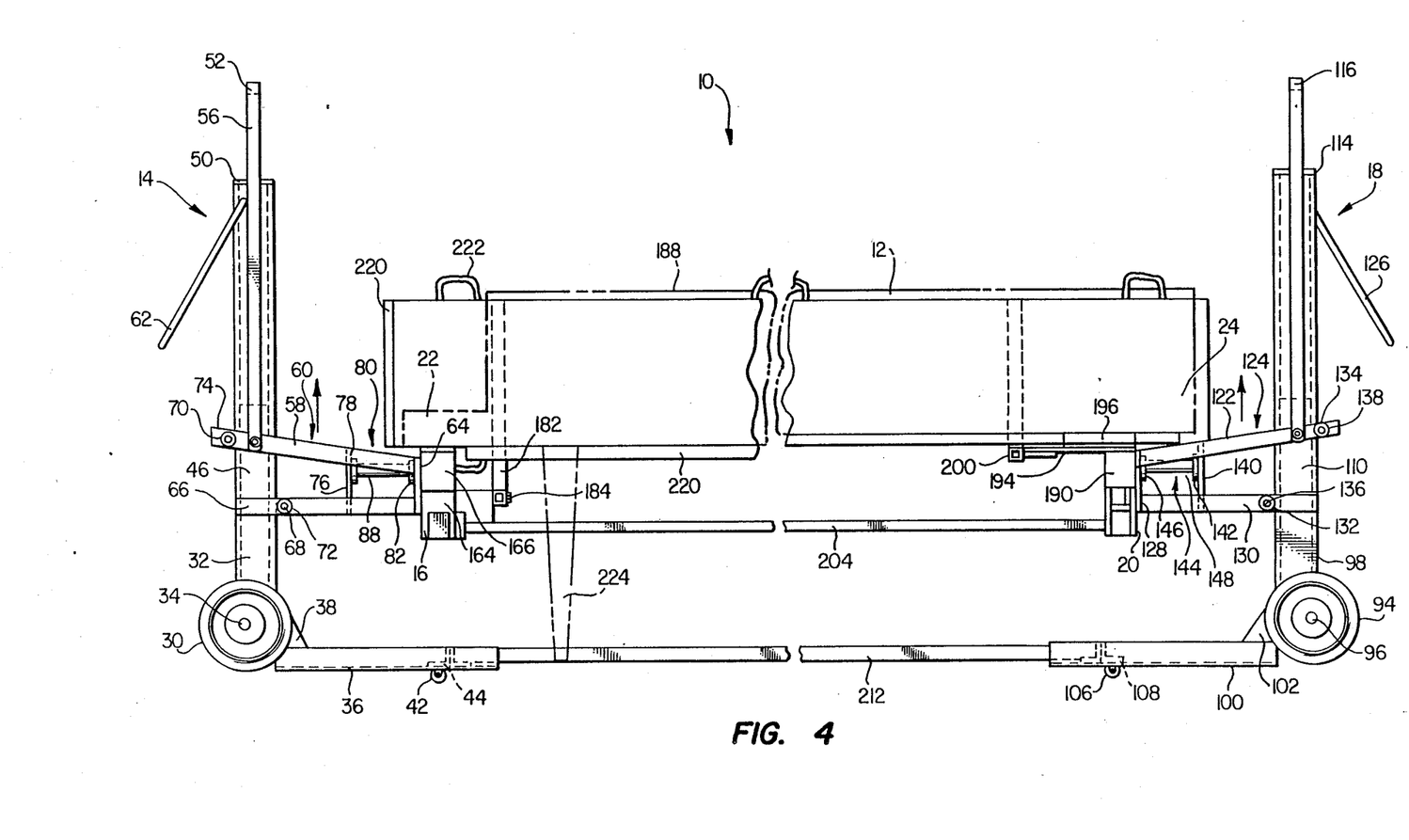
FIG. 4 is an enlarged scale fragmentary side elevational view of the apparatus after the piano has been slightly lifted thereby.

In order to engage piano moving apparatus 10 for elevation and rotation of piano 12, key jack assembly 14 and front jack assembly 18 are positioned about the key board end 22 and front end 24 of piano 12 respectively, such that jack stand mounts 60 and 124 are in the lowered position. An upper cross support bracket 204 is placed into position to secure key jack assembly 14 to front jack assembly 18. Dowel pins 206 of upper jack support bracket 204 engage dowel holes 208 of support portion 16 and support portion 20. Cross members 210 of upper jack support bracket 204 are also provided for support thereof. It is contemplated by those skilled in the art that upper jack support bracket 204 may be adjustable in length to accommodate various sizes of pianos. Once upper jack support bracket 204 is in position, floor bracket 212 is installed to further stabilize key jack 14 and front jack 18 one to the other. Floor bracket 212 includes gussets 214 having dowel holes 216 to be placed over pins 218, thereby securing cross rail 40 to cross rail 104. Floor bracket 212 thereby prevents unnecessary motion of key jack assembly 14 and front jack assembly 18 during elevation and rotation of piano 12. As seen in FIG. 4, handles 62 and 126 may be manually operated to elevate jack stand mounts 60 124 so that mounting pads 166, 180 and mounting pads 196, 198 engage respectively the key board end 22 and front end 24 and elevate piano 12. Piano board 188 is placed along the side of piano 12 to rest on piano support arms 182 and 200. Piano board 188, as seen in FIG. 1, includes retaining panels 220 to engage the underside and keyboard of piano 12. Piano board 188 further rests on spacers 186 and 202 of piano arms 182 and 200 (FIGS. 2 and 3) for proper positioning relative to piano 12. Board handles 222 are constructed of rope or other flexible material and function to facilitate movement of the board and piano during the course of the moving procedure. Once piano 12 has been elevated, its legs 224 may be removed.

In order to rotate piano 12 about its longitudinal axis, lock pins 93 and 158 are removed. As piano 12 is rotated (FIG. 5), moving dolly 26 is positioned beneath the lower side of piano 12. Moving dolly 26 is constructed with a recessed frame 226 to lower its center of gravity and safely hold the piano. Welded or otherwise secured to frame 226 are posts 228 (FIG. 6) which prevent piano 12 from overturning as it rest on its side. Further, posts 228 aid in manually moving dolly 26 and its load during transport. Further secured to recessed frame 226 adjacent casters 230 are rail bumpers 232 for protecting casters 230 and for guiding moving dolly 26 into transport trailer 234.

Figure 7:
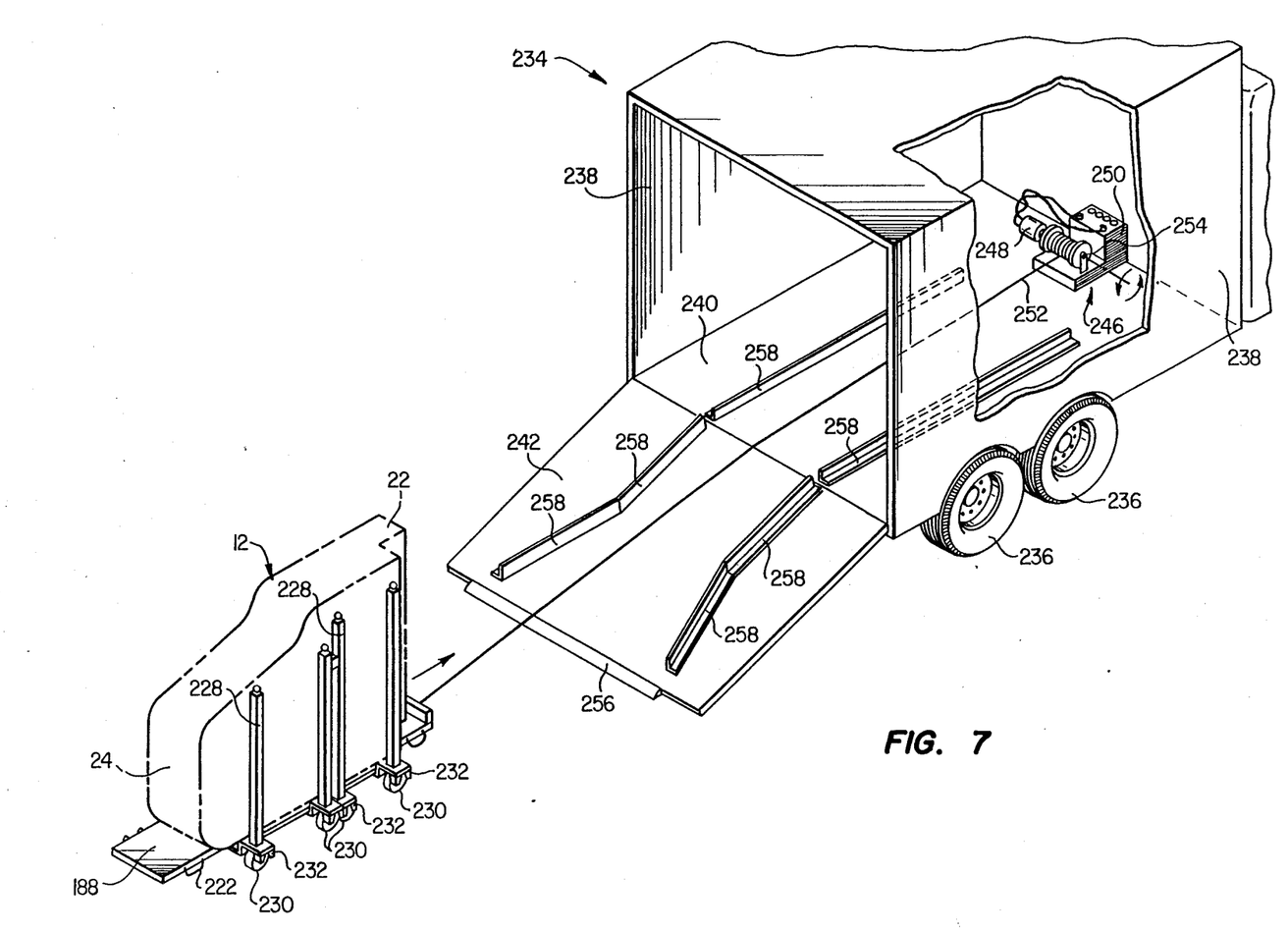
FIG. 7 is a fragmentary, partially cut-away perspective view of a transport trailer and illustrates the loading of the piano-carrying dolly into the trailer.

As seen in FIG. 7, transport trailer 234 may consist of any truck or trailer combination of standard commercial design, having wheel means 236 and side walls 238. As shown, trailer 234 also includes a standard drop tailgate 242. An electric winch 244 is secured to trailer bed 246, and may be powered by any suitable means, such as electric motor 248 and battery 250. A sufficient length of cord 152 extends from reel 154 outside the trailer for attachment to moving dolly 26. Upon actuation of winch means 246, the dolly platform and piano 12 are pulled over surface lip 256 onto drop tailgate 242 and into trailer 234. As shown, guide rails 258 are secured to floor bed 244 and drop tailgate 242 and meet with rail bumpers 232 to direct moving dolly 26 safely into trailer 234. Once within the trailer, piano 12 may be further secured for transport. Upon removal of piano 12 from trailer 234, the direction of electric motor 248 is reversed and moving dolly 26 may be unloaded in a controlled fashion while still connected to cord 252.

The use of piano moving apparatus 10 to elevate, rotate, and place piano 12 on it side for transport upon moving dolly 26 has resulted in a much improved manner for safely transporting delicate and costly grand pianos from one location to another. Although a preferred embodiment has been described in detail herein, those skilled in the art will recognize that various modifications and substitutions may be made to the specific embodiment disclosed without departing from the scope and spirit and invention as recited in the appended claims.

What is claimed is:

1. A piano moving apparatus comprising:
   first and second jack means for moving a piano, each jack means including a jack having a housing, a jack lift mounted in the housing, a load support means connected to the jack lift for engaging one or more underside portions of a piano, and a wheeled support means connected to the jack means for movement thereof;
   said load support means of each jack means including a plurality of interconnected piano supporting means for slidably supporting a piano, and a pivot means connected between the jack lift and interconnected piano supporting means for pivotally connecting the interconnected piano supporting means to the jack lift;
   said wheel support means including first and second wheels attached to the housing normal to the longitudinal axis of the interconnected piano supporting members; and
   a detachable piano board means for facilitating movement of a piano onto a transport means, the piano board means including a first retainer/support means extending upwardly of the load support means, a second retainer/support means normal to the first retainer means, and support arm means connected to the first retainer/support means for connection to the interconnected piano supporting means, whereby during piano pickup the first retainer/support means acts to retain the piano against slippage, during tilting the first and second retainer/support means coact to retain the piano against slippage, and when the piano board means is moved together with the piano to the transport means with the support arm means disconnected from the interconnected piano supporting means of the first and second jack means, the first retainer/support means acts as a piano support and the second retainer/support means acts as a piano retainer during movement of the transport means.

2. A piano moving apparatus according to claim 1 wherein:
   said pivot means includes first and second stops positioned, respectively, for limiting pivot movement to one direction and for limiting the amount of pivotal movement in the one direction.

3. A piano moving apparatus according to claim 1 further including:

a retractable tensioned third wheel mounted to said housing and positioned forwardly with respect to the first and second wheels and intermediate thereto, said third wheel being tensioned sufficiently for coacting with the first and second wheels for supporting the jack means only when unloaded.

4. A piano moving apparatus according to claim 1 further including:

an adjustable connecting means for connecting the first jack means to the second jack means for preventing movement of said first jack means with respect to said second jack means.

* * * * *